G. C. PHILLIPS.
COW TAIL HOLDER.
APPLICATION FILED MAR. 21, 1913.
1,101,657.
Patented June 30, 1914.
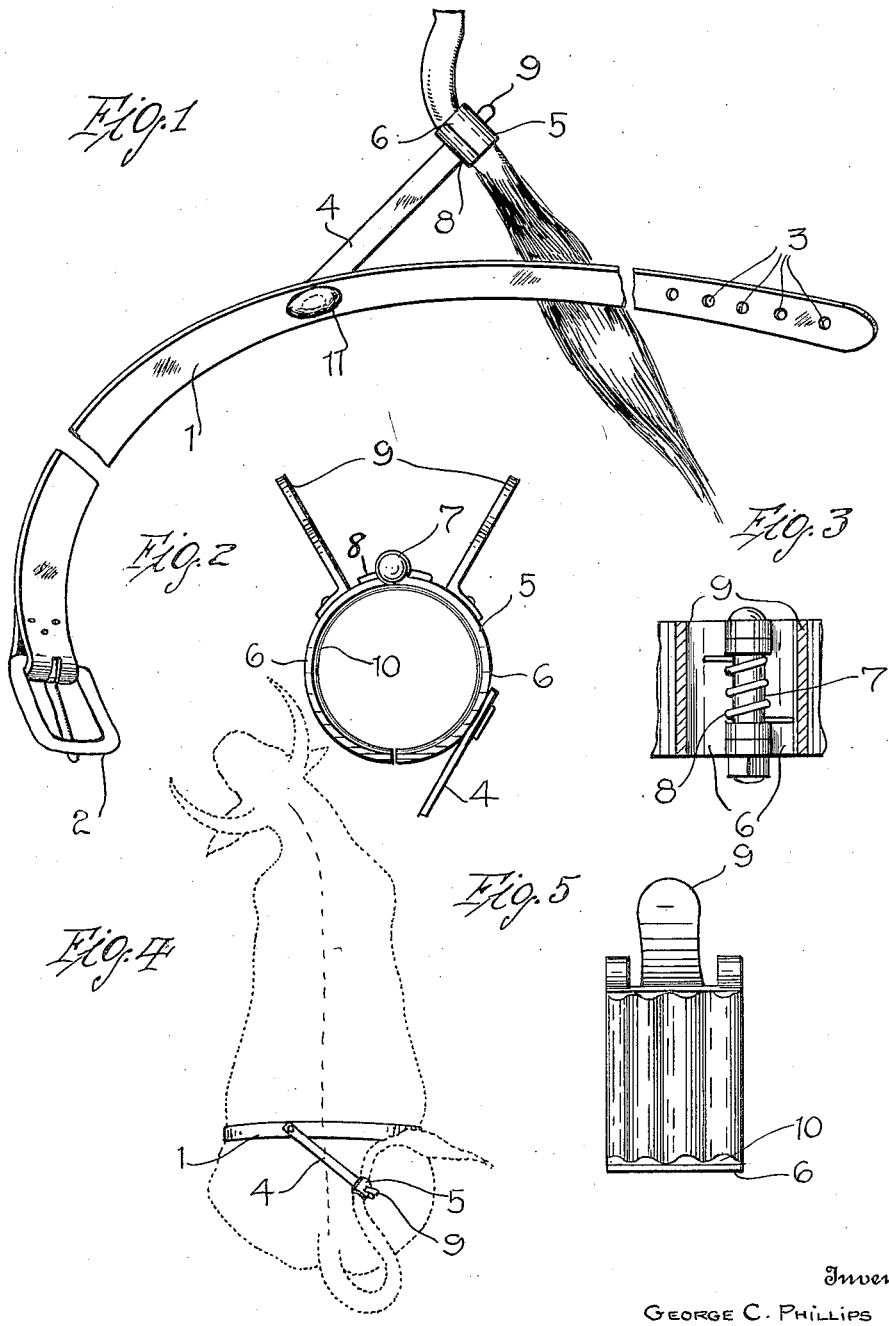
Inventor
GEORGE C. PHILLIPS
Witnesses
Robert M. Sutphen
A. I. Hind
By Watson E. Coleman
Attorney

UNITED STATES PATENT OFFICE.

GEORGE C. PHILLIPS, OF BROOKINGS, SOUTH DAKOTA.

COW-TAIL HOLDER.

1,101,657. Specification of Letters Patent. Patented June 30, 1914.

Application filed March 21, 1913. Serial No. 756,046.

*To all whom it may concern:*

Be it known that I, GEORGE C. PHILLIPS, a citizen of the United States, residing at Brookings, in the county of Brookings and State of South Dakota, have invented certain new and useful Improvements in Cow-Tail Holders, of which the following is a specification, reference being had to the accompanying drawings.

This invention relates to improvements in cow-tail holders and an object thereof is the provision of a device of this character which is adapted for use in holding a cow's tail while milking, thereby preventing the animal from switching its tail and striking the milker, or depositing foreign matter into the milk pail.

Another object of the invention is the provision of a cow-tail holder, which will hold the tail in an elevated position to permit the operation of the organic functions of the animal and prevent the tail from coming into contact with the deposits.

With these and other objects in view, my invention consists in the novel features of construction and arrangement of parts, to be hereinafter more fully described, claimed and illustrated in the accompanying drawing, in which—

Figure 1 is a perspective view showing the tail clamp attached to the tail of a cow; Fig. 2 is a side elevation of tail clamp; Fig. 3 is a fragmentary view partly in section of the tail clamp; Fig. 4 is a view showing my device secured to the body of a cow; and Fig. 5 is an elevation of one section of the tail clamp.

Referring more particularly to the drawing, the numeral 1 designates a body strap which is adapted to be secured around the body of a cow, one end of the strap being provided with a buckle 2, and the other end with a plurality of openings 3, whereby the strap may be secured to different sizes of cows. Secured to the strap 1 intermediate of its ends, is one end of an inclined clamp strap 4 to the opposite end of which is secured a tail clamp 5. The clamp 5 comprises two curved sections 6 which are hingedly secured together at one of their edges by a rod 7. The sections of the clamp are normally held in closed position by a coiled spring 8 which is arranged on the rod 7 so that the opposite ends thereof bear against the sections of the clamp. A finger piece 9 is secured to each of the sections near their connected edges the finger pieces being adapted to be forced toward each other to open the clamp against the action of the spring 8, whereby the cow's tail may be readily inserted into, or removed from the clamp. The sections of the clamp are preferably lined with corrugated leather, as at 10, to prevent slipping of the clamp upon the tail and to prevent the clamp from rubbing the tail. Riveted or otherwise secured to the inner face of the strap 1 near the medial portion thereof and at the junction of the inclined strap is a pad 11 of leather or other suitable material which is adapted to bear against the spinal column of the animal to prevent the strap 1 from turning relatively to the body of the animal.

In the practical use of my device, the strap 1 is tightened around the body of the animal to prevent it from kicking and the clamp is engaged with the tail of the animal just above the brush. It will be seen that the tail is held in a raised position on the back of the animal to one side of the center thereof by reason of the inclination of the clamp strap 4, so that no droppings from the animal will come into contact with the tail. The buckle is preferably disposed on the side of the cow facing the milker so that when the milking of one cow has been completed the device may be readily removed and secured to another cow. Owing to the adjustability of the strap 1, the holder may be secured to cows of different sizes. The pad 11 and the strap 4 are preferably secured to the strap 1 by the same fastening means.

Having thus fully described my invention what I desire to claim and secure by Letters Patent is:

As a new article of manufacture, a tail holder comprising an elongated flexible member adapted to be extended transversely around the body of an animal, the extremities of such member being provided with coacting engaging means, a second flexible member having one end portion secured to a face of the first named flexible member and having a clamping means at its free extremity, and a yieldable protuberance carried by the opposite face of the first mentioned flexible member at a point in close proximity to the connection between both of the flexible members, such protuberance being wholly confined beneath such flexible member and serving as a means to hold the first named member against endwise movement when in applied position.

In testimony whereof I hereunto affix my signature in the presence of two witnesses.

GEORGE C. PHILLIPS.

Witnesses:
H. H. Hoy,
H. B. Mathews.

Copies of this patent may be obtained for five cents each, by addressing the "Commissioner of Patents, Washington, D. C."